United States Patent [19]

Lee

[11] Patent Number: 4,966,511
[45] Date of Patent: Oct. 30, 1990

[54] EXPANSION BOLT UNIT FOR REPEATED USE

[76] Inventor: Yuan-Ho Lee, No. 851, Chung-San Rd., Nan-Pa. Tsun, Kuei-Jen Hsian, Tainan Hsieng, Taiwan

[21] Appl. No.: 365,692

[22] Filed: Jun. 14, 1989

[51] Int. Cl.$^5$ ............................................. F16B 13/06
[52] U.S. Cl. ......................................... 411/55; 411/60
[58] Field of Search .................. 411/55, 60, 61, 44, 411/57

[56] References Cited

U.S. PATENT DOCUMENTS

| | | |
|---|---|---|
| 2,321,170 | 6/1943 | Wallace .................................. 411/55 |
| 3,548,705 | 12/1970 | Nasser .................................. 411/60 |
| 3,606,814 | 9/1971 | Mackenzie ............................ 411/60 |
| 3,713,246 | 1/1973 | Kilroy, Jr. ........................... 411/546 |
| 4,263,833 | 4/1981 | Loudin et al. ........................ 411/55 |
| 4,610,587 | 9/1986 | Wollar et al. ........................ 411/60 |
| 4,611,485 | 9/1986 | Leslie ................................... 411/55 |
| 4,810,141 | 3/1989 | Rainville ............................. 411/55 |

Primary Examiner—Neill R. Wilson
Attorney, Agent, or Firm—Ladas & Parry

[57] ABSTRACT

An expansion bolt unit includes a pull device which is fixed on an expansion tube embedded within a rigid material and has a portion which remains outside of the rigid material that is adapted to be activated by a puller to be removed from the rigid material. A bolt member extends through the expansion tube and is engaged threadably with a nut. The pull device includes one or more pull flanges extending radially and outwardly from the outer end portion of the expansion tube which remains outside of the rigid material. The bolt member has a hexagonal stub section at an outer end thereof so that a socket wrench can be engaged with the stub section. In one embodiment, a sleeving is sleeved on the bolt member between the expansion tube and the nut so that the nut can be rotated relative to the bolt member, thereby expanding the chuck jaw segments of the expansion tube by moving the bolt member relative to the expansion tube.

6 Claims, 3 Drawing Sheets

4,966,511

EXPANSION BOLT UNIT FOR REPEATED USE

BACKGROUND OF THE INVENTION

This invention relates to an expansion bolt unit, more particularly to an expansion bolt unit which can be used repeatedly.

The improvement of this invention is directed to a conventional expansion bolt unit for architectural uses. Referring to FIG. 1, such a unit 10 includes an expansion tube 11 having a plurality of jaw segments 12 at an end portion thereof which are defined by axially extending slits 13, and a bolt member 14 having a frusto-conical section 15 and an externally threaded cylindrical section 16. A washer 17 and a retaining ring 18 are sleeved on the bolt member 14. A nut 19 is engaged with the cylindrical section 16.

In use, the frusto-conical section 15 of the bolt member 14 expands the jaw segments 12 as a result of the outward pull on the bolt member 14, thereby anchoring the unit 10 in a concrete structure such as the foundation of a house. However, it is difficult to remove the unit 10 from the masonry, concrete, or other rigid structure after use. Because this situation renders it impossible to repeatedly use the unit 10, manufacturers tend to make such a unit from inexpensive metals, such as copper and copper alloy, thereby weakening the unit.

SUMMARY OF THE INVENTION

It is therefore the main object of this invention to provide a strong expansion bolt unit which can be easily removed from a masonry, concrete, or other rigid structure for repeated use.

According to this invention, an expansion bolt unit is associated with a nut. The unit includes an expansion tube which is embedded within a rigid material. A plurality of axially extending slits are formed in an inner end portion of the expansion tube to define a plurality of jaw segments so as to constitute a chuck. A bolt member includes a frusto-conical section having a large-diameter end and a small-diameter end, and an externally threaded cylindrical section connected to the small-diameter end of the frusto-conical section. The expansion tube has an inner diameter which is smaller than the large-diameter end of the frusto-conical section and larger than the small-diameter end of the frusto-conical section so that the cylindrical section may be in turn inserted through the chuck and the remaining portion of the expansion tube. The nut can be engaged with the cylindrical section and can be rotated relative to the bolt member so as to expand the jaw segments of the expansion tube, thereby anchoring the unit in the rigid material. The unit is characterized by a pull device which is fixed on the expansion tube and has a portion outside of the rigid material which is adapted to be activated by a puller to all removal of the unit from the rigid material. The pull device includes one or more pull flanges extending radially and outwardly from the outer end portion of the expansion tube which is outside of the rigid material. The bolt member has a hexagonal stub section at an outer end thereof so that a socket wrench can be engaged therewith.

BRIEF DESCRIPTION OF THE DRAWINGS

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
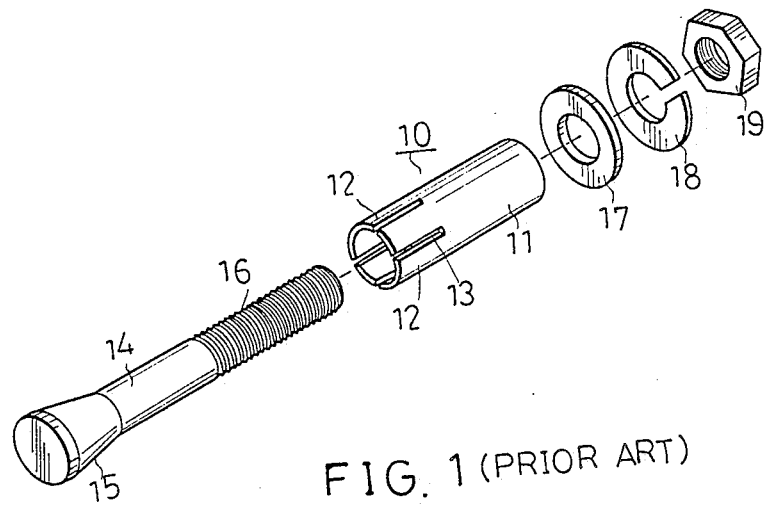
FIG. 1 is an exploded view of a conventional expansion bolt unit.
Figure 2:
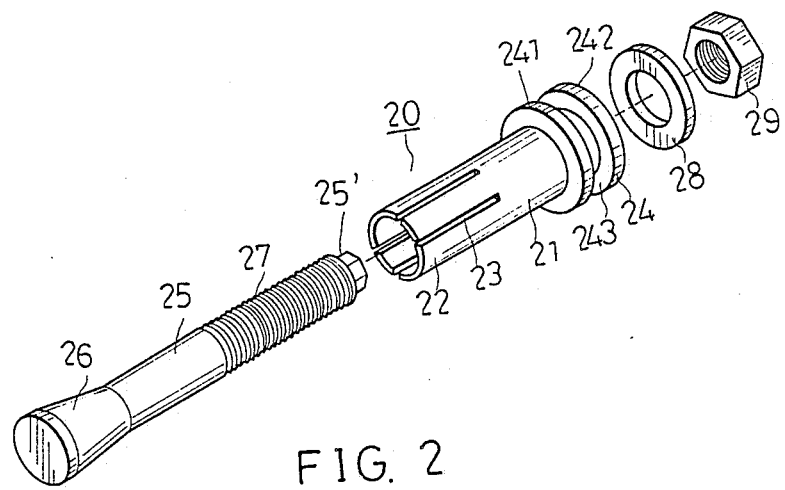
FIG. 2 is an exploded view of an expansion bolt unit according to a first embodiment of this invention.

Referring to FIG. 2, an expansion bolt unit 20 of this invention includes an expansion tube 21 with several jaw segments 22 defined by several axially extending slits 23 so as to constitute a chuck. A pull device 24 is provided at the outer end of the expansion tube 21 which consists of an obstructing flange 241 and a pull flange 242 between which an annular space 243 is defined. A bolt member 25 extends through the expansion tube 21 and has a frusto-conical inner end section 26 and an externally threaded cylindrical outer end section 27. A washer 28 is sleeved on the bolt member 25. A nut 29 is engaged with the threaded section 27 of the bolt member 25.

Figure 3:
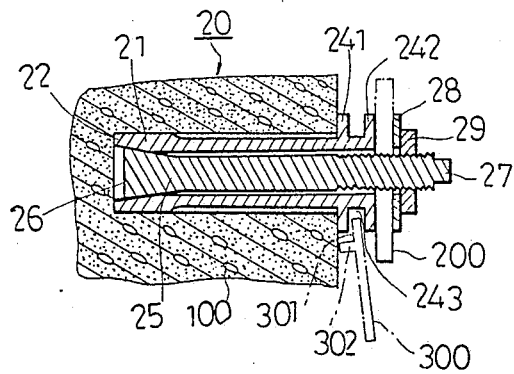
FIG. 3 is a sectional view showing an expansion bolt unit according to the first embodiment of this invention.

Referring to FIG. 3, when the unit 20 is to be used, the outer surface of a concrete structure 100 is drilled to form a bore which has a diameter slightly greater than the outer diameter of the expansion tube 21. The bolt member 25 is inserted through the expansion tube 21. The assembly of the bolt member 25 and the expansion tube 21 is then inserted into the bore until the obstructing flange 241 contacts the surface of the concrete structure 100. An article 200 to be anchored and the washer 28 are in turn sleeved on the outer end portion of the bolt member 25. The nut 29 is engaged with the threaded portion 27 of the bolt member 25 and is then rotated relative to the bolt member 25. The bolt member 25 has a hexagonal stub section 25' which can be engaged with a socket wrench (not shown) so as to effect a relative rotation between the nut 29 and the bolt member 25. When the nut 29 is tightened against the surface of the concrete structure 100, the bolt member 25 moves to the right so as to expand the jaw segments 22 of the expansion tube 21, thereby gripping the bolt member 25 within the expansion tube 21 and anchoring the unit 20 in the concrete structure 100. The article 200 to be anchored is therefore secured to the concrete structure 100 while maintaining a spaced-apart relation thereto.

When removal of the unit 20 from the concrete structure 100 is desired, the nut 29, the washer 28 and the article 200 to be anchored are all disengaged from the bolt member 25. The outer end surface of the bolt member 25 is then tapped with a hammer so as to release the frusto-conical section 26 of the bolt member 25 from the chuck jaw segments 22 of the expansion tube 21, after which the bifurcated end 301 of a lever type puller 300 is placed into the annular space 243 between the flanges 241, 242 of the expansion tube 21 in such a manner that the fulcrum rod 302 of the puller 300 rests on the surface of the concrete structure 100. The puller 300 can be actuated manually so as to remove the unit 20 from the concrete structure 100 in accordance with the principle of a lever.

The pull device 24 may be modified into any form which can be moved away from the surface of the concrete structure 100 by the puller 300.

Figure 4:
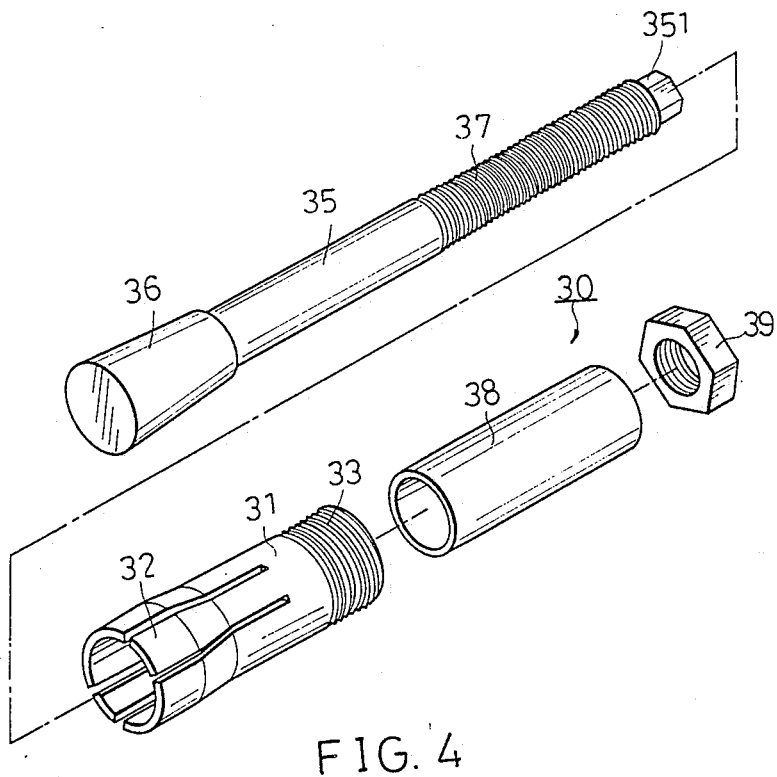
FIG. 4 is an exploded view of an expansion bolt unit according to a second embodiment of this invention in which the pull tube of said unit is not shown.
Figure 5:
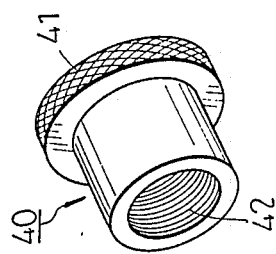
FIG. 5 is a perspective view showing the pull tube of the expansion bolt unit according to the second embodiment of this invention.

Referring to FIGS. 4 and 5, a second embodiment of this invention is shown. As illustrated, the second unit 30 includes: an expansion tube 31 having several jaw segments 32 and an externally threaded portion 31; a bolt member 35 having a frusto-conical section 36, an externally threaded section 37 and a hexagonal stub section 351; a sleeving 38; and a pull device or pull tube 40 including a pull flange 41 and an internally threaded portion 42. A nut 39 can be engaged with the threaded portion 37 of the bolt member 35. In this embodiment, the bolt member 35 is about 20 cm long, while the expansion tube 31 and the sleeving 38 are about 7-8 cm long.

Figure 6:
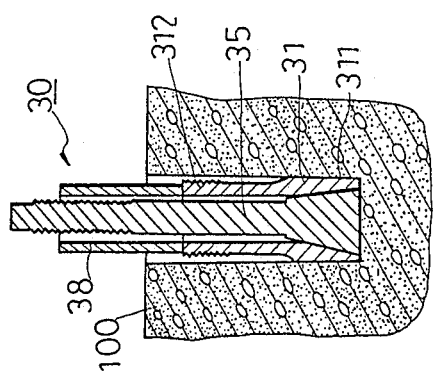
FIG. 6 is a schematic view illustrating how to anchor the expansion bolt unit in a concrete structure according to the second embodiment of this invention.

Referring to FIG. 6, when the unit 30 is to be used, the outer surface of the concrete structure 100 is drilled to form a bore of a length greater than the expansion tube 31. The assembly including the expansion tube 31 and the bolt member 35 is inserted into the bore, after which the sleeving 38 is sleeved on the outer end portion of the bolt member 35 in such a manner that the sleeving 38 abuts against the outer end of the expansion tube 31. The nut 39 is engaged with the threaded portion 37 of the bolt member 35 and is rotated relative to the bolt member 35 so as to anchor the expansion tube 31 and the bolt member 35 within the bore in the concrete structure 100. The nut 39 and the sleeving 38 are removed from the bolt member 35. The article 200 to be anchored is sleeved on the bolt member 35 and the nut 39 is engaged with the bolt member 35 so as to fix the article 200 on the surface of the concrete structure 100 in an overlapping relation thereto.

Figure 7:
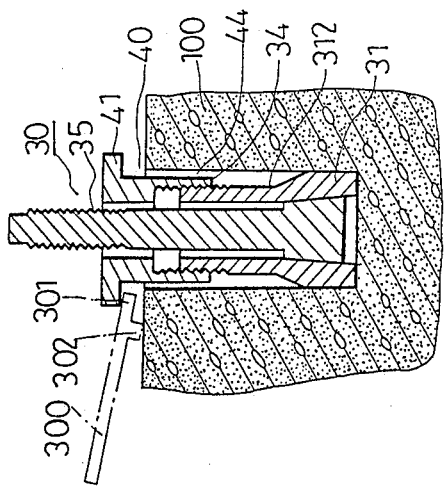
FIG. 7 is a schematic view illustrating how to remove the expansion bolt unit from the concrete structure in accordance with the second embodiment of this invention.

Referring to FIG. 7, when removal of the unit 30 from the concrete structure 100 is desired, the nut 39 and the article 200 which is anchored are disengaged from the bolt member 35. The pull tube 40 is then engaged with the threaded portion 33 of the expansion tube 31 in such a manner that the pull flange 41 and the surface of the concrete structure 100 define an appropriate annular space therebetween for the insertion of the puller 300 therein.

All parts of the units 20, 30 are made of cast iron which has a substantial strength so as to fix firmly the article 200 to be anchored on the surface of the concrete structure 100.

With this invention thus explained, it is apparent that numerous modifications and variations can be made without departing from the spirit and scope of this invention. It is therefore intended that this invention be limited only as indicated in the appended claims.

I claim:

1. An expansion bolt unit associated with a nut, said unit comprising:

an expansion tube adapted to be closely received within a bore in a surface of a rigid material and having a plurality of axially extending slits formed in an inner end portion thereof to define a plurality of jaw segments so as to constitute a chuck;

a bolt member including a frusto-conical section having a large-diameter end and a small-diameter end, and an externally threaded cylindrical section connected to said small-diameter end of said frusto-conical section, said expansion tube having an inner diameter which is smaller than said large-diameter end of said frusto-conical section so that said cylindrical section may be in turn inserted through said chuck and remaining portion of said expansion tube;

said nut being engagable with said cylindrical section and rotatable relative to said bolt member so as to expand said jaw segments of said expansion tube, thereby anchoring said unit in said rigid material; and a pull device having two flanges extending radially and outwardly from an outer end portion of said expansion tube which is outside of said rigid material, one of said flanges abutting against a surface of said rigid material, said flanges being spaced apart at a predetermined distance so that an end of said puller can be placed between said flanges.

2. An expansion bolt unit as claimed in claim 1, wherein said flanges are integrally formed with said expansion tube.

3. An expansion bolt unit associated with a nut, said unit comprising:

an expansion tube, adapted to be closely and completely received within an inner end portion of a bore which is formed in a rigid material, said tube having a plurality of axially extended slits formed in an inner end portion thereof to define a plurality of jaw segments so as to constitute a chuck;

a bolt member including a frusto-conical section having a large-diameter end and a small-diameter end, said bolt member having an externally threaded cylindrical section connected to said small-diameter end of said frusto-conical section, said expansion tube having an inner diameter which is smaller than said large-diameter end of said frusto-conical section and larger than said small-diameter end of said frusto-conical section so that said cylindrical section may be in turn inserted through said chuck and remaining portion of said expansion tube, the nut being engagable with said cylindrical section and rotatable relative to said bolt member so as to expand said jaw segments of said expansion tube, thereby anchoring said unit in said rigid material; and a pull device securable to said expansion tube in such a manner that said pull device has a portion outside of said rigid material which is adapted to be activated by a puller to remove unit from said rigid material.

4. An expansion bolt unit as claimed in claim 3, further comprising a sleeving which can be sleeved on said bolt member in such a manner that an inner end of said sleeving contacts an outer end of said expansion tube, whereby, when said nut is engaged with said cylindrical section and is rotated relative to said bolt member, said jaw segments of said expansion tube are expanded so as to anchor said unit in said rigid material.

5. An expansion bolt unit associated with a nut, said unit comprising:

an expansion tube, adapted to be closely and completely received within an inner end portion of a bore which is formed in a rigid material, said tube having a plurality of axially extended slits formed in an inner end portion thereof to define a plurality of jaw segments and having an externally threaded outer end portion so as to constitute a chuck;

a bolt member including a frusto-conical section having a large-diameter end and a small-diameter end, said bolt member having an externally threaded cylindrical section connected to said small-diameter end of said frusto-conical section, said expansion tube having an inner diameter which is smaller than said large-diameter end of said frusto-conical section and larger than said small-diameter end of said frusto-conical section so that said cylindrical section may be in turn inserted through said chuck and remaining portion of said expansion tube, the nut being engagable with said cylindrical section and rotatable relative to said bolt member so as to expand said jaw segments of said expansion tube, thereby anchoring said expansion bolt unit in said rigid material; and an internally threaded pull tube engagable with said outer end portion of said expansion tube and having a pull flange extending radially and outwardly from an outer end of said pull tube which is adapted to be activated by a puller to remove unit from said material.

6. An expansion bolt unit as claimed in claim 3, wherein said bolt member has a head shaped to receive a suitable tool for turning said expansion bolt at an outer end thereof.

* * * * *